(12) United States Patent
Stapleford

(10) Patent No.: US 9,337,889 B1
(45) Date of Patent: May 10, 2016

(54) DRONE AIRCRAFT DETECTOR

(71) Applicant: Scott Stapleford, Londonderry, NH (US)

(72) Inventor: Scott Stapleford, Londonderry, NH (US)

(73) Assignee: PICA Product Development LLC, Derry, NH (US)

( * ) Notice: Subject to any disclaimer, the term of this patent is extended or adjusted under 35 U.S.C. 154(b) by 0 days.

(21) Appl. No.: 14/870,384

(22) Filed: Sep. 30, 2015

(51) Int. Cl.
| | |
|---|---|
| *H04B 1/7117* | (2011.01) |
| *H04B 1/7103* | (2011.01) |
| *H04B 1/12* | (2006.01) |
| *H04W 72/08* | (2009.01) |
| *H04W 24/10* | (2009.01) |

(52) U.S. Cl.
CPC .............. *H04B 1/7103* (2013.01); *H04B 1/123* (2013.01); *H04W 24/10* (2013.01); *H04W 72/082* (2013.01)

(58) Field of Classification Search
USPC .................................................. 375/148, 343
See application file for complete search history.

(56) References Cited

U.S. PATENT DOCUMENTS

| | | | | |
|---|---|---|---|---|
| 8,472,571 B2* | 6/2013 | Desai | ................... | H04B 1/1027 329/349 |
| 2001/0050948 A1* | 12/2001 | Ramberg | ........... | H04B 1/70752 375/148 |
| 2004/0030530 A1* | 2/2004 | Li | ........................... | C30B 25/18 702/179 |

* cited by examiner

*Primary Examiner* — Eva Puente
(74) *Attorney, Agent, or Firm* — Joseph E. Funk

(57) ABSTRACT

A detector for detecting the presence of Direct Sequence Spread Spectrum (DSSS) signals transmitted in the 2.4 GHz band by a drone aircraft controller to control the flight of a drone aircraft. The detector has a microprocessor that performs autocorrelation analysis of multiple samples of the received DSSS signals and noise present in multiple spaced channels within the 2.4 GHz band to detect consistent correlation peaks which indicate the presence of DSSS signals. The microprocessor also determines the relative strength of the correlation peaks and energizes LEDs generally indicating how close the drone aircraft controller is to the drone aircraft detector. The detector has a first antenna means, a second antenna means, and a receiver and the microprocessor performs time difference of arrival measurements between the signals received by the first antenna means and the second antenna means to determine the general direction of the drone aircraft controller with respect to the drone aircraft detector and the processor displays this general direction utilizing other LEDs on the detector.

7 Claims, 3 Drawing Sheets

Detector 100

DRONE AIRCRAFT DETECTOR

FIELD OF THE INVENTION

This invention relates to portable handheld devices used to detect the localized use of a consumer or commercial type drone aircraft.

BACKGROUND OF THE INVENTION

The use of remotely operated drone aircraft is becoming more widespread as the cost of these aircraft is decreasing and their technical capability is increasing, including extended flight time and carrying cameras. This widespread use includes use by the military, police, news agencies, other commercial businesses and private individuals.

While proper uses of remotely operated drone aircraft has been increasing, at the same time questionable uses of such remotely operated drone aircraft has been increasing. More specifically, such questionable use of drone aircraft has created invasion of privacy issues, especially when the drone aircraft are equipped with cameras. Individuals have experienced the unacceptable presence of camera equipped drone aircraft in private areas of their property and at windows of their houses and apartments. Laws and regulations have not been fully implemented governing when and where drone aircraft may properly be used.

Accordingly, there is a need for a detector that can detect the presence of drone aircraft operating within an unacceptable distance from such a detector. The detector will warn an individual or individuals of the presence of a drone aircraft and permit them to take appropriate actions to preserve their privacy, or to take other proper actions.

SUMMARY OF THE INVENTION

Remotely operated drone aircraft are controlled by radio signals transmitted from a manually operated radio controller. There is a radio transmitter in the controller and there is a receiver on the drone aircraft that receives signals from the controller and the received signals in turn control the operation of digital servos to control the flight operation of the drone aircraft in a manner known in the art. The great majority of these radio transmitters and receivers utilize spread spectrum digital data signals known as the Direct Sequence Spread Spectrum (DSSS). A narrowband signal and the spread-spectrum signal both use the same amount of transmit power and carry the same information. However, the power density of the spread-spectrum signal is much lower than the narrowband signal. At the receiving end of a direct-sequence system, the spread spectrum signal is de-spread to generate the original narrowband signal.

In DSSS the stream of digital data control signals transmitted by the controller is divided into small pieces, each of which is allocated to a very narrow frequency channel across a frequency spectrum. During operation the small pieces of the control signal are periodically and regularly transmitted in the assigned narrow frequency channels across the frequency spectrum. The digital data control signals at the point of transmission is combined with a higher data-rate bit sequence (also known as a chipping code) that divides the data according to a predetermined spreading ratio. The chipping code is redundant and helps the control signals to resist interference, while enabling the original digital data control signal to be recovered even if some digital data bits are damaged during transmission.

More specifically, DSSS systems transmit on a single selected center frequency with a much wider bandwidth than is actually needed by the transmitted data control signal. This spreading of the transmitted signal over a large bandwidth make the resulting wideband signal appear as a noise signal which allows greater resistance to intentional and unintentional interference with the transmitted signal.

The original narrow band data control signal is sent through a "spreading code generator" within the transmitter to be broken up into the small pieces that are each assigned to a different frequency across the narrow frequency spectrum having the wider bandwidth that is centered on the selected center frequency. The spreading code generator multiplies the digital control signal by a coding scheme which is unique to each radio transmitter.

With DSSS systems the 2.4 GHz control signal transmission appears to be random white noise to any receiver other than a mated receiver in the drone aircraft. The mated receiver picks up this "noise" signal. From the mating process, performed before flight of the drone aircraft, the receiver in the drone aircraft knows the coding scheme used by the radio controller. A processor associated with the receiver in the drone aircraft uses the assigned coding scheme to reconstruct the received digital control signal back to its original form. The reconstructed digital control signal is used to control digital servo mechanisms within the drone aircraft to control its flight pattern. It uses the coding scheme to reconstruct the digital control signal back to its original form.

More specifically, DSSS spreads its signal continuously over a wide frequency band. DSSS maps the information bearing bit-pattern at the sending station into a higher data rate bit sequence using a "chipping" code. The chipping code (also known as processing gain) introduces redundancy which allows data recovery if certain bit errors occur during transmission. The FCC rules the minimum processing gain should be 10, typical systems use processing gains of 20.

In the 2.4 GHz band the transmission of DSSS digital data control signals for remotely operated drone aircraft is restricted to ones of a plurality of channels having a required minimum spacing of 1 MHz between channels. DSSS systems transmit on a single selected frequency with a much wider bandwidth than the original data signal. The original narrow band data signal is sent through a "spreading code generator" within the transmitter. The spreading code generator multiplies the original narrow band data signal by a much higher frequency. The spreading code generator also multiplies the signal by a coding scheme which is unique to each radio. This coding scheme could be as simple as multiplying the signal by 1 or −1 in a systematic way that appears to be random. The 2.4 GH transmission will appear to be random white noise for any receiver other than the mated receiver. The mated receiver picks up this "noise" signal. From the mating process the receiver knows the coding scheme used by the transmitter. It uses this to reconstruct the signal back to its original form.

Complementary Code Keying (CCD), is a set of 64 eight-bit code words used to encode data for 5.5 and 11 Mbps data rates in the 2.4 GHz band. The code words have unique mathematical properties that allow them to be correctly distinguished from one another by a drone aircraft receiver even in the presence of substantial noise and multipath interference.

A drone aircraft detector in accordance with the present invention has a receiver for receiving DSSS signals transmitted by a drone aircraft controller following an assigned coding scheme determined when the drone aircraft controller and the receiver in in the drone aircraft are mated before flight.

However, the assigned coding scheme of any DSSS signal to be detected is unknown to the drone aircraft detector. In addition, because any transmitted DSSS signal is spread over a large bandwidth that makes the resulting wideband signal appear as a noise signal, the drone aircraft detector must first detect the presence of a DSSS signal and that is not a simple task without the assigned coding scheme. However, the novel drone aircraft detector does not need to perform any complex mathematical analysis and determine the assigned coding scheme of the received DSSS signal, since the detector is not going to retrieve the drone aircraft digital control signals in the received DSSS signal. The drone aircraft detector only detects the existence of a DSSS signal amongst the noise signals it is already receiving.

Since any received DSSS signals are generally hidden amongst noise signals (low signal-to-noise ratio) received by a drone aircraft detector, blind detection techniques are therefore required to detect if a DSSS signal is present amongst the noise signals.

What is performed by the drone aircraft detector is the blind estimation of the sequence or code length (or symbol period) of the DSSS transmissions amongst the noise. Thus, the blind estimation of a sequence code length is repeated for many sequence code lengths. This repetition is accomplished by utilizing an autocorrelation estimation based detection method. The method first searches for autocorrelation peaks that may appear at integer times of the pseudo noise sequence period, over a period of time, and then make a judgment by the cumulative peak-to-average criteria. Sequence-length estimation algorithms are important for this purpose. In this manner the sequence length of DSSS spreading codes is determined and by the autocorrelation of the received signals over time, the presence of a DSSS signal is confirmed. Stated another way the cyclostationarity of DSSS signals can be exploited by correlating the received signal, or a portion thereof, with itself. Detection for the presence of a DSSS signal is then performed by analyzing the output of the correlation process for the presence of correlation peaks. Noise signals will not have correlation peaks.

More particularly, the autocorrelation estimation is based on statistical decision theory where the drone aircraft detector must decide whether a DSSS signal is present or not, given a set of noisy data. The classical signal detection approach involves the following the steps: (1) a test statistic value is calculated from the noisy data (or received signal), (2) the test statistic value is compared with a threshold, slightly above the noise level of the received signal, which is determined from the detection performance specifications, and (3) if the threshold is exceeded, and after autocorrelation over period of time, the sequence code length of the DSSS signal is determined and a decision is made that a DSSS signal is present. This autocorrelation effectively extracts the DSSS signal from the background noise.

When the presence of a DSSS signal is successfully detected, further action can be taken such as determining the direction from which the DSSS signal is being received.

DESCRIPTION OF THE DRAWING

The invention will be better understood upon reading the following Detail Description in conjunction with the drawings in which.

DETAIL DESCRIPTION

Figure 1:
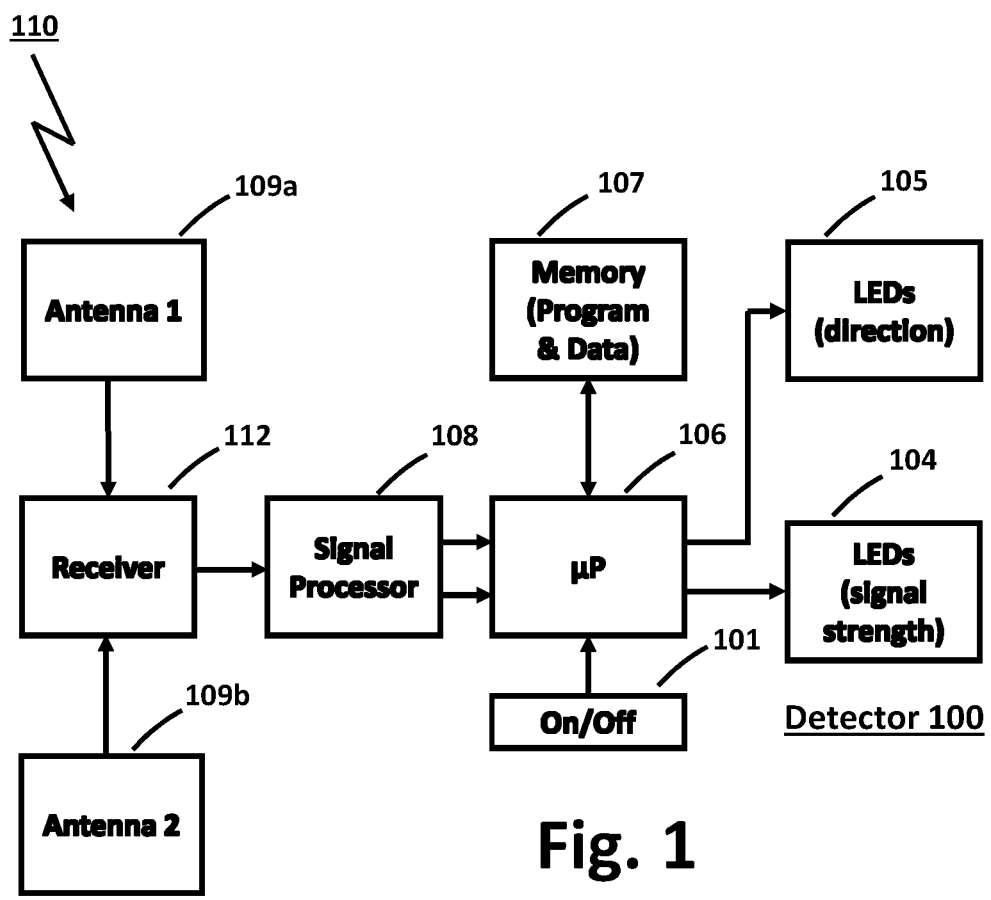
FIG. 1 is a block diagram schematic of the novel drone aircraft detector.

FIG. 1 is a block diagram schematic of the novel drone aircraft detector 100. The detector comprises an ON/OFF switch 101 that is utilized to turn the detector 100 on and off. The detector 100 also comprises a microprocessor 106 that operates under control of a program stored in memory 107 to process radio signals 110 received in the 2.4 GHz band that have been transmitted by a drone aircraft controller (not shown). The radio signals 110 are spread spectrum digital data signals known as Direct Sequence Spread Spectrum (DSSS) signals. The DSSS signals have been described in the Background of the Invention.

Memory 107 is also used to store received DSSS signals that have been digitized and preliminarily processed by signal processor 108. Memory 107 also stores the results of microprocessor 106 processing the digitized and preliminarily processed DSSS signals.

Two antennas 109a and 109b receive any DSSS signals in the vicinity of drone aircraft detector 100. The received DSSS signals indicate the presence of a drone aircraft in the vicinity of drone aircraft detector 100.

Two antennas 109a and 109b are utilized to be able to determine from the signals received by these two antennas the direction from which the DSSS signals are being received. In FIG. 1 received DSSS signals are represented by signal 110 being received from the direction indicated by the arrow. It is obvious that the signal at a specific point on the wavefront of DSSS signal 110 will impinge upon antenna1 109a before the same signal at the same specific point will impinge upon antenna2 109b. The time difference of arrival of signal 110 at the two antennas 109a and 109b are determined in a manner known in the art utilizing time difference of arrival (TDOA) processing to determine the direction from which signal 110 originates with respect to drone aircraft detector 100. Such TDOA processing is taught in U.S. Pat. No. 7,804,448 issued Sep. 28, 2010 to Jeffrey F. Bull et al. Such TDOA processing is also taught in U.S. Pat. No. 8,866,672 issued Oct. 21, 2014 to Ken A. Stroud.

DSSS signal 110 is in a digital format but is an analog signal having a frequency within one's of the frequency bands of each of the 10 channels in the 2.4 GHz band. Receiver 112 receives the radio signals from antennas1&2 109a and 109b, and forwards them to signal processor 108 which converts them to a pure digital format, and forwards the digitized signals to microprocessor 106 which stores them in memory 107 for autocorrelation processing to detect the presence of a DSSS signal therein as described in the Background of the Invention.

Signal Processor 108 has a plurality of digital filters, one set for each of the antennas 109a and 109b. The filters are controlled by microprocessor 106 to search through received signals in the 2.4 GHz band looking for DSSS signals.

The radio frequency signal 110 from each of antennas 1&2, 109a and 109b and received by receiver 112 is filtered and processed by signal processor 108 before being forwarded from signal processor 108 to microprocessor 106 which stores multiple samples of them in memory 107 for further autocorrelation processing to detect the presence of a DSSS signal used to control a drone aircraft (not shown) in signal 110. In addition, microprocessor 106 makes a determination as to the strength of the DSSS signal which provides an indication as to how close the drone aircraft controller and its associated drone aircraft are to drone aircraft detector 100. Microprocessor 106 generates a signal which is utilized to energize a number of LEDs 104 providing an approximate indication of how close the last mentioned drone aircraft is to the drone aircraft detector 100.

In addition, microprocessor 106 performs time difference of arrival (TDOA) measurements on the signal 110 received at antenna1 109a and the same signal 110 received at antenna2 109b, both connected to receiver 112 and then processed by signal processor 108, to calculate an approximate determination of the direction from which DSSS signals are received with relationship to drone aircraft detector 100, and it provides a signal that energizes one or two of LEDs 105. It is to be understood that if drone aircraft detector 100 is moved it will impact the TDOA measurements. Such TDOA processing is known in the art and is described in many U.S. Patents including U.S. Pat. Nos. 8,866,672 and 7,804,448.

More specifically, when the complex envelopes of an emitter signal are collected by two sensors (antennas 109a and 109b, receiver 112 and preprocessed by signal processor 108) then the TDOAs may be determined directly by calculating the cross-ambiguity function (CAF) utilizing microprocessor 108. A frequency difference of (FDOA) can also be determined from calculating the CAF, which can be very useful if prosecuting a mobile target. However, our target, a drone aircraft controller (not shown) is assumed stationary. The solution is determined by locating the peak of the CAF. It is worth noting that when the two sensors (drone aircraft detector 100) or the drone aircraft controller are not in motion then the cross-ambiguity function is simply the autocorrelation function. Once the TDOAs are determined the Newton-Raphson technique is used to determine a line-of-bearing. The Newton-Raphson algorithm is based on estimation theory and uses an over-determined set of linear equations.

Microprocessor 106 is performing blind processing on the received signals 110 to determine if there are DSSS signals contained therein. One example of performing such blind processing is described in an October 2014 paper entitled "Blind sequence-length estimation of low-SNR cyclostationary sequences", authored by J. D. Vlok and J. C. Olivier of the School of Engineering, University of Tasmania, Hobart 7005, Australia and published in Defence, Peace, Safety & Security (DPSS), Council for Scientific and Industrial Research (CSIR), Pretoria 0001, South Africa. This paper is incorporated herein in its entirety by reference. Another example of performing such blind processing is described in an October 2014 thesis paper entitled "Detection of Direct Sequence Spread Spectrum Signals", authored by Jacobus David Vlok of the School of Engineering, University of Tasmania, Hobart 7005. These papers are incorporated herein in their entirety by reference. This blind processing is accomplished by correlating the received signal, or a portion thereof, with itself. Detection is then performed by analyzing the output of the correlation process for the presence of correlation peaks. The simplest form of correlation detection is to isolate a segment from the intercepted signal and to correlate the two. Assuming the signal to noise ratio is sufficiently high, the output of the correlator will contain correlation peaks if it contains a spreading code (or a large section thereof) that repeats within itself. These peaks can either be positive or negative which can all be made positive using a squaring (or absolute value) process.

See also the following listed and other papers that are cited in the paper cited in the previous paragraph: (1) E. R. Adams, M. Gouda, and P. C. J. Hill, "Statistical techniques for blind detection & discrimination of m-sequence codes in DS/SS systems", in Proceedings of the IEEE 5th International Symposium on Spread Spectrum Techniques and Applications, vol. 3, Sun City, South Africa, September 1998, pp. 853-857; (2) G. Burel and C. Bouder, "Blind estimation of the pseudo-random sequence of a direct sequence spread spectrum signal," in Proceedings of IEEE Military Communications Conference (MILCOM), vol. 2, Los Angeles, Calif., USA, October 2000, pp. 967-970; (3) G. Burel, "Detection Of Spread Spectrum Transmissions Using Fluctuations of Correlation Estimators", in IEEE-ISPACS, Nov. 5-8, 2000 Honolulu, Hi., USA. These three papers are incorporated herein in their entirety by reference.

Another technique for performing blind processing on the received DSSS signal 110 is to take many time shifted samples of signal 110 looking for autocorrelation spikes that will be consistent and may be distinguished from noise spikes which will not be consistent. That is, the periodicity of the delay-multiply signal of DSSS signals coupled with autocorrelation can feel the character of a periodic signal such as DSSS signals. Stated slightly different autocorrelation, also called series correlation, is the correlation of a given sequence with itself as a function of time lag. Such auto-correlation is taught in U.S. Pat. No. 8,953,719, issued Feb. 10, 2015 to Kazuyuki Ozaki.

Figure 2:
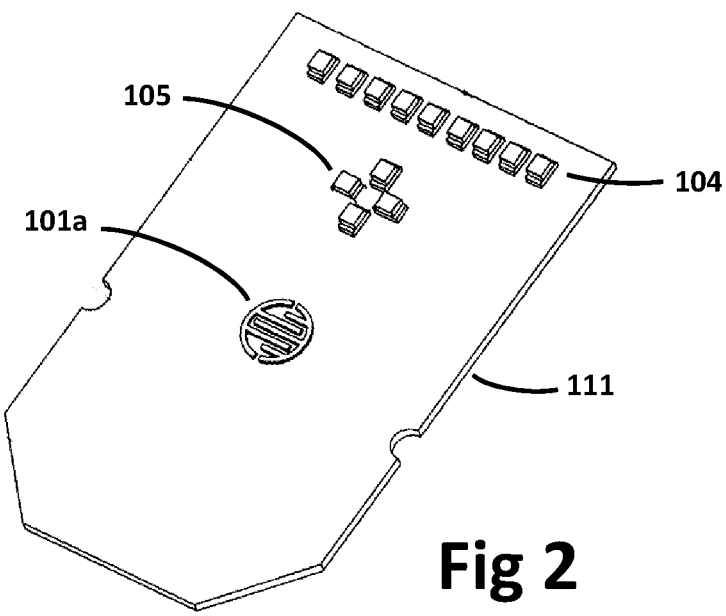
FIG. 2 shows the layout of a first side of a circuit board of the novel drone aircraft detector on which are mounted LEDs indicating the direction from which drone aircraft signals originate, and the strength of those signals.

FIG. 2 shows the layout of a first side of a circuit board 111 of the novel drone aircraft detector 100 on which are mounted LEDs indicating the direction from which drone aircraft control DSSS signals originate, and the strength of those DSSS signals. More specifically, these LEDs are signal strength indicating LEDs 104 and signal direction LEDs 105. In addition, there are inter-meshed printed circuit paths 101a that comprise part of ON/OFF switch 101 and other parts of switch 101 interconnect these paths 101a to turn drone aircraft detector 100 ON or OFF.

Figure 3:
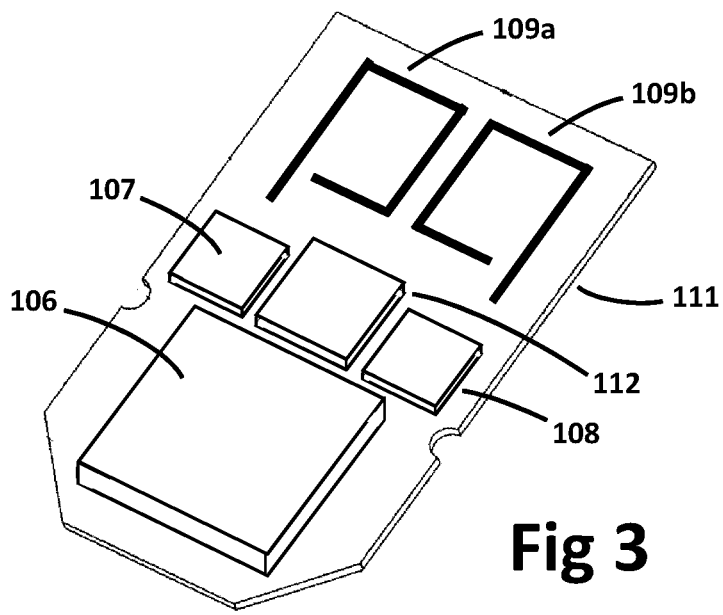
FIG. 3 shows a layout of a second side of a circuit board of the novel drone aircraft detector on which are mounted a microprocessor, a memory, a signal processor, a receiver and two antennas and a battery.

FIG. 3 shows a layout of a second side of a circuit board 111 of the novel drone aircraft detector 100 on which are mounted a processor 106, memory 107, signal processor 108, receiver 112, and two antennas 109a and 109b.

Figure 4:
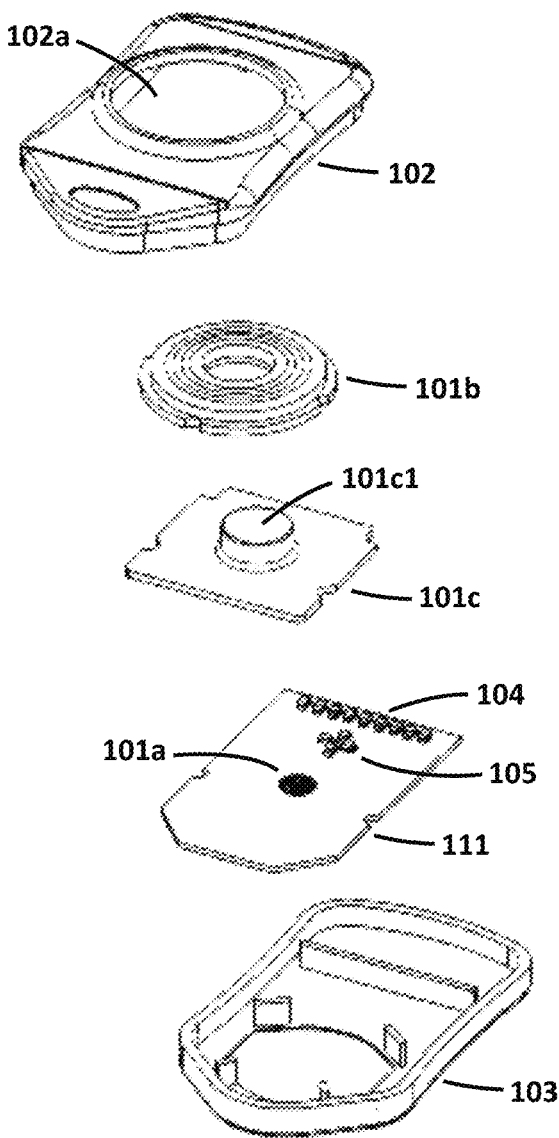
FIG. 4 is an exploded view of various pieces that make up the novel drone aircraft detector.

FIG. 4 is an exploded view of various pieces that make up the novel drone aircraft detector. Shown are the first side of circuit board 111 has been described with reference to FIG. 2, and other hardware elements that comprise detector 100. There is a button 101c that is slightly warped to keep the bottom side of button 101c spaced from the inter-meshed printed circuit paths 101a described with reference to FIG. 2. When the raised portion of button 101c is depressed a conductive underside of this button interconnects the inter-meshed printed circuit paths 101a to turn drone detector 100 on, and is subsequently depressed to again interconnect circuit paths 101a to turn drone detector 100 off.

Element 101b is a flexible piece having a hole in its center through which the elevated portion 101c1 of button 101c extends, and element 101b sits in a 102a hole through the top cover 102. There is also a bottom cover 103 in which printed circuit board 111 sits with elements 101b and 101c resting thereon. Cover 102 snap fastens to bottom cover 103, but may be fastened by screws. Top cover 102 is removed from bottom cover 103 to access the underside of printed circuit board 111 when a battery mounted thereon needs replacement. The battery is replaceable and is physically mounted to be electrically connected to circuit paths on circuit board 111, in a manner well known in the art, to provide electrical power to the various electrical components comprising drone aircraft detector 100.

While what has been described herein is a preferred embodiment of the invention, those skilled in the art will recognize that numerous changes may be made without departing from the spirit and scope of the invention.

The invention claimed is:

1. A detector for detecting the presence of Direct Sequence Spread Spectrum (DSSS) signals transmitted by a controller to control an operation of a drone aircraft, the DSSS and other signals and noise being present in multiple spaced channels within the 2.4 GHz band, the DSSS drone aircraft control signals having a low signal to noise ratio and the noise in the 2.4 GHz band masks the presence of the DSSS signals, the detector comprising:

a first antenna means for receiving any signals, including DSSS signals, and noise present in the 2.4 GHz band;

receiver means connected to the first antenna means and cooperating therewith for receiving the signals, including DSSS signals, and noise in the 2.4 GHz band;

a signal processor that converts the received signals from the receiver means into a digital format; and microprocessor means for performing blind processing on all signals received by the means and antenna means, and converted to digital format by the signal processor, in a first channel of the 2.4 GHz band looking for any DSSS signals, the processor means performing the blind processing by utilizing autocorrelation techniques to compare a first time sample of noise and other signals present in the first channel of the 2.4 GHz band with multiple subsequent time samples received within the first channel to detect any correlation peaks present in the first channel indicating the presence of a DSSS signal, wherein the microprocessor means repeats performing the blind processing utilizing autocorrelation techniques to compare a first time sample of noise and other signals present in the each of the other channels of the 2.4 GHz band with multiple subsequent time samples received within each of the other channels to detect any correlation peaks present in each of the other channels indicating the presence of a DSSS signal, wherein the detection of the presence of correlation peaks in any of the channels of the 2.4 GHz band by the microprocessor means indicates the presence of a DSSS signal in those channels, and wherein the microprocessor means performs no further processing on detected DSSS signals to decode those signals.

2. The detector for detecting the presence of DSSS signals transmitted to control a drone aircraft in accordance with claim 1 further comprising a first plurality of LED lights and the microprocessor means energizes some number of the first plurality of LED lights depending upon the strength of any correlation peaks of signals detected in all the channels of the 2.4 GHz band.

3. The detector for detecting the presence of DSSS signals transmitted to control a drone aircraft in accordance with claim 2 further comprising a second antenna means and the microprocessor means repeats the signal processing claimed in claim 1 of any received signals, including DSSS signals, and noise present in the 2.4 GHz band received using the receiver and the second antenna means, and converted to digital format by the signal processor, and wherein the detected correlation peaks of signals present in each of the channels received utilizing the first antenna means have a corresponding set of detected correlation peaks of signals present in each of the channels received utilizing the second antenna means, but the detected correlation peaks of signals received utilizing the first antenna means and the second antenna means are time shifted from each other due to the spacing of the two antennas, and the time shift provides a general indication of the direction with respect to the detector from which the DSSS signals are being transmitted, and the microprocessor means determines the general direction by performing a time difference of arrival (TDOA) measurement between the detected correlation peaks of signals present in each of the channels utilizing the first antenna means and the detected correlation peaks of signals present in each of the channels utilizing the second antenna means.

4. The detector for detecting the presence of DSSS signals transmitted to control a drone aircraft in accordance with claim 2 further comprising a second plurality of LED lights and the microprocessor means energizes at least one of the second plurality of LED lights to indicate the direction with respect to the detector to a transmitter transmitting the DSSS signals to control the drone aircraft.

5. The detector for detecting the presence of DSSS signals transmitted to control a drone aircraft in accordance with claim 1 further comprising a second antenna means and the microprocessor means repeats the signal processing claimed in claim 1 of any received signals, including DSSS signals, and noise present in the 2.4 GHz band received using the second antenna means, and converted to digital format by the signal processor, and wherein the detected correlation peaks of signals present in each of the channels received utilizing the first antenna means have a corresponding set of detected correlation peaks of signals present in each of the channels received utilizing the second antenna means, but the detected correlation peaks of signals received utilizing the first antenna means and the second antenna means are time shifted from each other due to the spacing of the first and second antenna means, and the time shift provides a general indication of the direction with respect to the detector from which the DSSS signals are being transmitted, and the microprocessor means determines the general direction by performing a time difference of arrival (TDOA) measurement between the detected correlation peaks of signals present in each of the channels utilizing the first antenna means and the detected correlation peaks of signals present in each of the channels utilizing the second antenna means.

6. The detector for detecting the presence of DSSS signals transmitted to control a drone aircraft in accordance with claim 5 further comprising a first plurality of LED lights and the microprocessor means energizes some number of the first plurality of LED lights depending upon the strength of any correlation peaks of signals detected in all the channels of the 2.4 GHz band.

7. The detector for detecting the presence of DSSS signals transmitted to control a drone aircraft in accordance with claim 5 further comprising a second plurality of LED lights and the microprocessor means energizes at least one of the second plurality of LED lights to indicate the direction with respect to the detector to a transmitter transmitting the DSSS signals to control the drone aircraft.

\* \* \* \* \*